United States Patent

[11] 3,576,484

[72] Inventor Charles C. Gambill
 Kokomo, Ind.
[21] Appl. No. 879,867
[22] Filed Nov. 25, 1969
[45] Patented Apr. 27, 1971
[73] Assignee General Motors Corporation
 Detroit, Mich.

[54] SPEED CONTROL CIRCUIT FOR SPLIT PHASE MOTORS
 4 Claims, 1 Drawing Fig.
[52] U.S. Cl. .................................................. 318/221,
 318/225, 318/227, 318/230, 318/345
[51] Int. Cl. .................................................... H02p 5/40,
 H02p 1/44
[50] Field of Search ........................................... 318/220,
 221, 225, 227, 230, 345

[56] References Cited
 UNITED STATES PATENTS
3,349,307 10/1967 Licata et al. .................. 318/221
3,385,077 5/1968 Marsteller .................... 318/227X
3,403,315 9/1968 Maynard ...................... 318/227

Primary Examiner—Oris L. Rader
Assistant Examiner—Gene Z. Rubinson
Attorneys—Eugene W. Christen, Creighton R. Meland and Richard G. Stahr ABSTRACT: A speed control circuit for split phase motors of the type having the series combination of a phase winding and an electrical impedance element connected in parallel with the running winding. One diagonal of a resistive bridge circuit having at least one variable resistor is connected across the phase winding of the motor and the base-emitter electrodes of a transistor are connected across the other diagonal of the bridge circuit. With the bridge circuit unbalanced with a change of resistance value of the variable resistor in a direction to produce emitter-base current flow through the transistor, this device conducts through the emitter-collector electrodes to complete an energizing circuit for the gate-cathode electrodes of a silicon-controlled rectifier. The resulting gate-cathode current flow triggers this device conductive through the anode-cathode electrodes thereof to complete a low resistance circuit in shunt with the phase winding of the motor.

Patented April 27, 1971 3,576,484
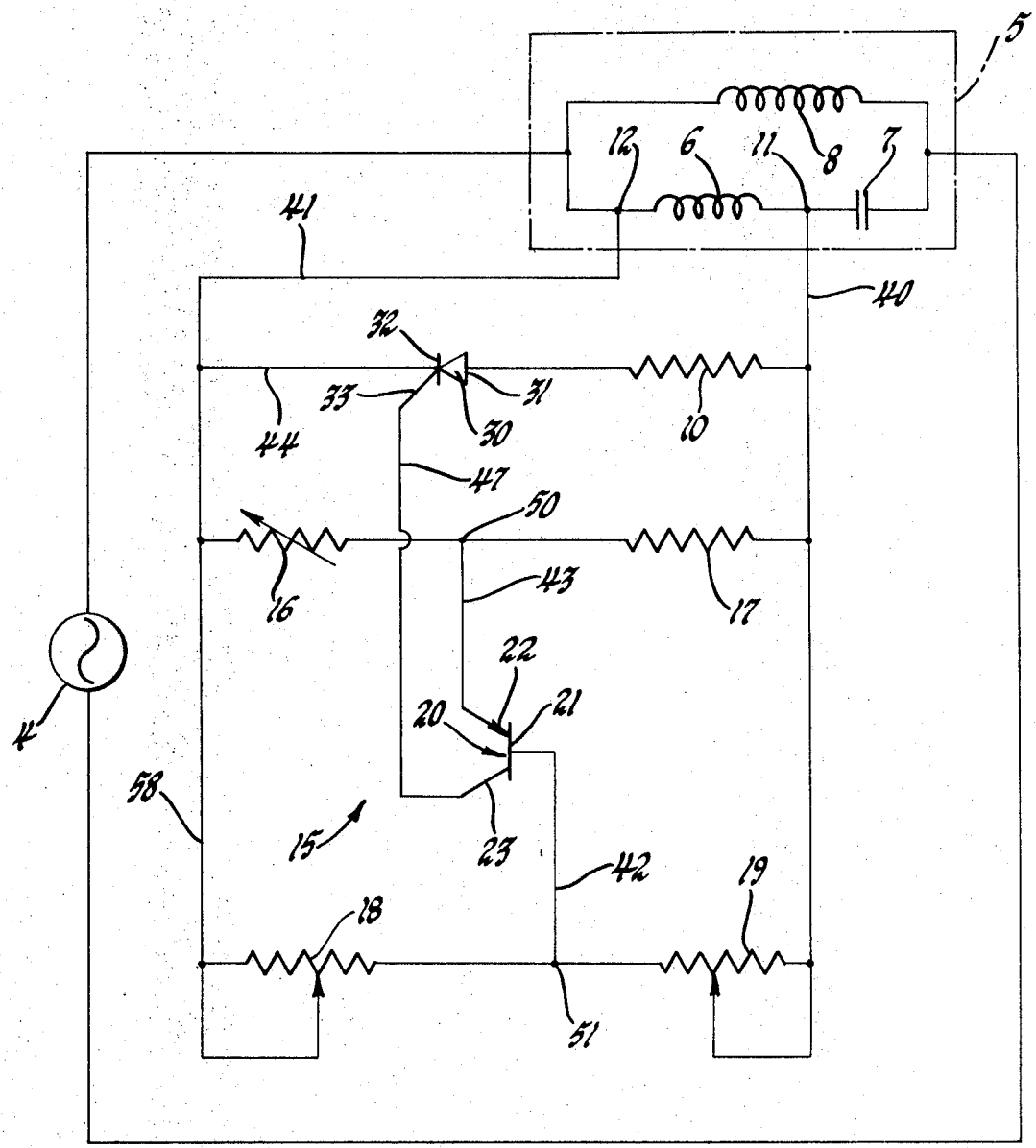
INVENTOR.
Charles C. Gambill
BY
Richard G. Stahl
ATTORNEY

SPEED CONTROL CIRCUIT FOR SPLIT PHASE MOTORS

This invention is directed to motor speed control circuits, and, more specifically, to an infinitely variable speed control circuit for use with split phase motors.

With prior art speed control circuits for split phase motors, the control or switching elements are connected in series with the motor across a source of alternating current potential, consequently, the control or switching elements carry full load motor current. Therefore, these elements must have an electric current rating high enough to continuously carry full load motor current. As the cost of electrical elements increases rapidly with increased electric current rating, a speed control circuit for split phase motors wherein the control or switching elements do not carry full load motor current, thereby permitting the use of control or switching elements of a lower current rating, is desirable.

It is, therefore, an object of this invention to provide an improved speed control circuit for split phase motors.

It is another object of this invention to provide an improved speed control circuit for split phase motors wherein the control or switching elements do not carry full load motor current.

In accordance with this invention, a speed control circuit for split phase motors is provided wherein one diagonal of an impedance bridge is connected across the phase winding of the motor and connected across the other diagonal are the base-emitter electrodes of a transistor which is triggered conductive when the bridge circuit becomes unbalanced due to a change in the resistance value of a variable impedance element thereof to complete an energizing circuit for the gate-cathode electrodes of a silicon-controlled rectifier to trigger the silicon-controlled rectifier conductive to establish a low resistance circuit in shunt with the phase winding of the motor.

For a better understanding of the present invention, together with additional objects, advantages and features thereof, reference is made to the following description and accompanying single FIGURE drawing which sets forth the novel speed control circuit of this invention in schematic form.

Although the operation of the novel speed control circuit of this invention will be described in this specification as used with a permanent split capacitor-type motor, it is to be specifically understood that this speed control circuit is equally satisfactory for use with any split phase motor having an electrical impedance element connected in series with the phase winding.

Referring to the FIGURE, the novel speed control circuit for split phase motors of this invention is set forth in schematic form in combination with a source of alternating current potential 4 and a split phase motor 5 of the type having the series combination of a phase winding 6 and an electrical impedance element, capacitor 7, connected in parallel with the running winding 8.

Source of alternating current potential 4 may be any one of several known in the art and, per se, forms no part of this invention, consequently, it has been represented in the FIGURE by the accepted schematic symbol.

Briefly, the novel speed control circuit for split phase motors of this invention includes an impedance bridge circuit 15 including at least one variable impedance element 16; a normally open electrical switching device having two current-carrying elements of the type which is electrically operable to an electric circuit closing condition through the current-carrying elements thereof in response to an applied potential, may be type PNP transistor 20 having a control electrode and two current-carrying electrodes; and a silicon-controlled rectifier 30 having an anode electrode 31, a cathode electrode 32, and a gate electrode 33.

The potential drop across phase winding 6 of motor 5 while energizing current flows therethrough is used as a control potential which is applied across one diagonal of bridge circuit 15 through leads 40 and 41 which connect one diagonal of bridge circuit 15 across respective terminal ends 11 and 12 of phase winding 6.

The potential appearing across the other diagonal of bridge circuit 15 is applied to the electrical switching device 20 through leads 42 and 43 which connect the control electrode, base electrode 21, and a selected one of the current-carrying electrodes, emitter electrode 22, of transistor 20 across the other diagonal of bridge circuit 15.

The anode-cathode electrodes of silicon-controlled rectifier 30 are connected in shunt across phase winding 6 of motor 5 through a circuit which may be traced from terminal end 11 of phase winding 6, through lead 40, resistor 10, the anode-cathode of electrodes of silicon-controlled rectifier 30, and leads 44 and 41 to the other terminal end 12 of phase winding 6.

The gate-cathode electrodes of silicon-controlled rectifier 30 and the current-carrying elements, emitter electrode 22 and collector electrode 23, of transistor 20 are connected in series across phase winding 6 through a circuit which may be traced from terminal end 11 of phase winding 6, through lead 40, resistor 17, lead 43, the emitter-collector electrodes of transistor 20, lead 47, the gate-cathode electrodes of silicon-controlled rectifier 30 and leads 44 and 41 to terminal end 12 of phase winding 6.

In the FIGURE, impedance bridge circuit 15 is shown to be a resistor bridge circuit comprising variable resistor 16, resistor 17, variable resistor 18 and resistor 19 connected in a bridge-type configuration. It is to be specifically understood, however, that other suitable impedance elements may be substituted for these resistors without departing from the spirit of the invention.

Variable resistor 16 may be of the type which changes in resistance value in response to any external influence such as temperature, pressure, potential, current, light or any other external influence, or it may be a manually operated rheostat or potentiometer. Consequently, this element has been illustrated in the FIGURE by the accepted symbol which indicates an impedance element which is variable in response to any external influence. To properly balance the bridge circuit, either one or both of resistors 18 and/or 19 may also be made variable.

With silicon-controlled rectifier 30 in the not conducting condition, substantially full line potential is applied across motor 5, consequently, motor 5 operates at the high speed as determined by the number of poles produced by the stator windings. With silicon-controlled rectifier 30 in the conducting condition, resistor 10 is connected in shunt across phase winding 6 of motor 5, consequently, a portion of the phase winding current is shunted through resistor 10 to reduce the magnitude of current flow through phase winding 6 and a direct current potential component is introduced into the stator windings of motor 5. The combination of this reduction of current flow through phase winding 6 and the direct current potential component which provides a dynamic braking action reduces the speed of motor 5, consequently, motor 5 operates at a reduced speed as determined by the amount of the reduction of current flow through phase winding 6 which, of course, is determined by the resistance value of resistor 10.

Therefore, to operate motor 5 at a reduced speed, silicon-controlled rectifier 30 is triggered conductive through the anode-cathode electrodes thereof to connect resistor 10 in shunt across phase winding 6.

To operate motor 5 at a reduced speed, it is necessary that the bridge circuit 15 be unbalanced in a direction to produce emitter-base current flow through transistor 20 to trigger this device conductive through the emitter-collector electrodes thereof to complete a gate-cathode energizing circuit for silicon-controlled rectifier 30.

Silicon-controlled rectifier 30 will conduct through the anode-cathode electrodes thereof only during the half-cycles of alternating current supply potential during which the potential upon terminal end 11 of phase winding 6 is of a positive polarity with respect to terminal end 12 as only during these half-cycles is the anode-cathode electrodes of silicon-controlled rectifier 30 forward poled. As transistor 20 is of the PNP type, the potential upon junction 50 of bridge circuit 15 must be of a positive polarity with respect to junction 51 to produce emitter-base current flow therethrough. Therefore, to trigger silicon-controlled rectifier 30 conductive through the anode-cathode electrodes thereof during the half-cycles of alternating current supply potential during which the potential upon terminal end 11 of phase winding 6 is of a positive polarity with respect to terminal end 12, bridge circuit 15 must become unbalanced, during these half-cycles, in a direction to produce emitter-base current flow through type PNP transistor 20.

To decrease the speed of motor 5, variable resistor 16 is adjusted or changed in the direction to increase the resistance value thereof to produce a greater potential drop thereacross, a condition which will result in a potential across junctions 50 and 51 which is of a positive polarity upon junction 50 with respect to junction 51 during the half-cycles of alternating current supply potential during which the potential upon terminal end 11 of phase winding 6 is of a positive polarity with respect to terminal end 12.

Bridge circuit 15 is balanced with resistor 16 adjusted to a low resistance value by adjusting variable resistor 18 and/or 19, a condition which will result in a zero potential across junctions 50 and 51.

With an increase of resistance of variable resistor 16, the potential drop thereacross increases to produce a potential across junctions 50 and 51 which is of a positive polarity upon junction 50 with respect to junction 51 during the half-cycles of alternating current supply potential during which the potential upon terminal end 11 of phase winding 6 is of a positive polarity with respect to terminal end 12. As this potential is applied across the emitter-base electrodes of transistor 20 through leads 42 and 43 in the proper potential polarity relationship to produce emitter-base current flow through a type PNP transistor, transistor 20 conducts through the emitter-base electrodes thereof through a circuit which may be traced from terminal end 11 of phase winding 6, through lead 40, resistor 17, lead 43, the emitter-base junction of transistor 20, lead 42, variable resistor 18 and leads 58 and 41 to terminal end 12 of phase winding 6. This emitter-base current flow through transistor 20 produces emitter-collector current flow therethrough to complete an energizing circuit across phase winding 6 for the gate-cathode electrodes of silicon-controlled rectifier 30 through a circuit which may be traced from terminal end 11 of phase winding 6, through lead 40, resistor 17, lead 43, the emitter-collector electrodes of transistor 20, lead 47, the gate-cathode electrodes of silicon-controlled rectifier 30 and leads 44 and 41 to terminal end 12 of phase winding 6.

This flow of gate current through silicon-controlled rectifier 30 triggers this device conductive through the anode-cathode electrodes thereof to connect resistor 10 in shunt across phase winding 6.

With resistor 10 and conducting silicon-controlled rectifier 30 connected in shunt across phase winding 6 of motor 5, the current flow through phase winding 6 is reduced in magnitude and a direct current potential component is introduced into the stator winding of motor 5. This reduction of phase current through phase winding 6 and the direct current potential component reduces the speed of motor 5, consequently, motor 5 operates at a reduced speed.

The speed at which motor 5 operates depends upon the electrical angle over which silicon-controlled rectifier 30 conducts during each half-cycle of alternating current supply potential during which the potential upon terminal end 11 of phase winding 6 is of a positive polarity with respect to terminal end 12, the greater the conduction angle, the slower the speed of motor 5. That is, the longer the period of time the speed of motor 5 is reduced due to the reduced phase winding current and the introduction of a direct current potential component into the stator windings while silicon-controlled rectifier 30 is conducting through the anode-cathode electrodes, the slower the speed at which motor 5 operates.

The electrical angle over which silicon-controlled rectifier 30 conducts through the anode-cathode electrodes is dependent upon the electrical angle at which transistor 20 is triggered conductive through the emitter-collector electrodes. Transistor 20 is triggered conductive only when the potential difference across junctions 50 and 51 of bridge circuit 15 is of a sufficient magnitude and of the proper polarity relationship to produce emitter-base current flow therethrough. The magnitude of this potential is determined by the resistance value of variable resistor 16 for any electrical angle, the higher resistance value of variable resistor 16 the earlier during each half-cycle of alternating current supply potential during which the potential upon terminal end 11 of phase winding 6 is of a positive polarity with respect to terminal end 12 that the potential across junctions 50 and 51 is of a sufficient magnitude and of the correct polarity relationship to produce emitter-base current flow through transistor 20. Therefore, the speed of motor 5 may be infinitely varied between maximum and minimum by adjusting or varying variable resistor 16.

Those prior art split phase motor speed control circuits which use solid-state electrical switching elements to switch full load motor current tend to produce objectionable electrical noise and/or motor mechanical noise with each switching operation. As the electrical switching device in the novel speed control circuit of this invention switches only the small phase current, the objectionable electrical and/or mechanical noises produced by prior art control circuits with each switching operation are eliminated.

The novel speed control circuit of this invention provides the following desirable advantages over prior art speed control circuits: (1) Low cost; (2) High starting and stalling torque; (3) Little, if any, objectionable electrical and/or mechanical noise.

While specific electrical devices and polarities have been set forth in this specification, it is to be specifically understood that alternate electrical devices having similar electrical characteristics and compatible electrical polarities may be substituted therefor without departing from the spirit of the invention.

I claim:

1. A speed control circuit for split phase motors comprising in combination with a source of alternating current potential and a split phase motor of the type having the series combination of a phase winding and an electrical impedance element connected in parallel with the running winding,
    an impedance bridge circuit including at least one variable impedance element,
    means for connecting one diagonal of said bridge circuit across said phase winding of said motor,
    a normally open electrical switching device having two current-carrying elements of the type which is electrically operable to an electrical circuit closing condition through the current-carrying elements thereof in response to an applied potential,
    means for applying the potential appearing across the other diagonal of said bridge circuit to said electrical switching device,
    a silicon-controlled rectifier having anode, cathode, and gate electrodes,
    means for connecting said anode-cathode electrodes of said silicon-controlled rectifier in shunt across said phase winding of said motor, and
    means for connecting said gate-cathode electrodes of said silicon-controlled rectifier and said current-carrying elements of said electrical switching device in series across said phase winding of said motor.

2. A speed control circuit for split phase motors comprising in combination with a source of alternating current potential and a split phase motor of the type having the series combination of a phase winding and an electrical impedance element connected in parallel with a running winding,
    a resistor bridge circuit including at least one variable impedance element,
    means for connecting one diagonal of said bridge circuit across said phase winding of said motor, a normally open electrical switching device having two current-carrying elements of the type which is electrically operable to an electric circuit closing condition through the current-carrying elements thereof in response to an applied potential, means for applying the potential appearing across the other diagonal of said bridge circuit to said electrical switching device, a silicon-controlled rectifier having anode, cathode, and gate electrodes, means for connecting said anode-cathode electrodes of said silicon-controlled rectifier in shunt across said phase winding of said motor, and means for connecting said gate-cathode electrodes of said silicon-controlled rectifier and said current-carrying electrodes of said electrical switching device in series across said phase winding of said motor.

3. A speed control circuit for split phase motors comprising in combination with a source of alternating current potential and a split phase motor of the type having the series combination of a phase winding and an electrical impedance element connected in parallel with a running winding, an impedance bridge circuit including at least one variable impedance element, means for connecting one diagonal of said bridge circuit across said phase winding of said motor, a transistor having a control and two current-carrying electrodes, means for connecting said control electrode and a selected one of said current-carrying electrodes of said transistor across the other diagonal of said bridge circuit, a silicon-controlled rectifier having anode, cathode, and gate electrodes, means for connecting said anode-cathode electrodes of said silicon-controlled rectifier in shunt across said phase winding of said motor, and means for connecting said gate-cathode electrodes of said silicon-controlled rectifier and said current-carrying electrodes of said transistor in series across said phase winding of said motor.

4. A speed control circuit for split phase motors comprising in combination with a source of alternating current potential and a split phase motor of the type having the series combination of a phase winding and an electrical impedance element connected in parallel with a running winding, an impedance bridge circuit including at least one variable impedance element, means for connecting one diagonal of said bridge circuit across said phase winding of said motor, a transistor having base, emitter and collector electrodes, means for connecting said base-emitter electrodes of said transistor across the other diagonal of said bridge circuit, a silicon-controlled rectifier having anode, cathode, and gate electrodes, means for connecting said anode-cathode electrodes of said silicon-controlled rectifier in shunt across said phase winding of said motor, and means for connecting said gate-cathode electrodes of said silicon-controlled rectifier and said collector-emitter electrodes of said transistor in series across said phase winding of said motor.